United States Patent [19]
Eickmeyer

[11] Patent Number: 5,410,948
[45] Date of Patent: May 2, 1995

[54] COOKING GRILLS WITH AUTOMATICALLY ROTATABLE FOOD SUPPORTING RACKS

[76] Inventor: Bryon G. Eickmeyer, 611 E. Benton St., Mount Olive, Ill. 62069

[21] Appl. No.: 215,105

[22] Filed: Mar. 21, 1994

[51] Int. Cl.⁶ .................... A47J 37/04; A47J 43/18
[52] U.S. Cl. .................................... 99/335; 99/427; 99/448; 99/450
[58] Field of Search ............ 99/348, 334, 349, 335, 99/393–400, 419, 421 R, 421 H, 421 HH, 421 HV, 426, 427, 448, 449, 450, 482; 126/9 B, 41 B, 25 R, 9 R

[56] References Cited

U.S. PATENT DOCUMENTS

| | | | |
|---|---|---|---|
| D. 199,712 | 12/1964 | Elliott | 99/427 X |
| 2,760,428 | 8/1956 | Boyajian | 99/427 |
| 2,895,408 | 7/1959 | Glenny | 99/427 |
| 3,566,777 | 3/1971 | Koziol | 99/421 |
| 3,802,331 | 4/1974 | Zickefoose | 99/443 R |
| 4,421,016 | 12/1983 | Sich | 99/421 P |
| 4,442,763 | 4/1984 | Beller | 99/421 HV |
| 4,470,343 | 9/1984 | Didier | 99/448 |
| 4,548,130 | 10/1985 | Diener et al. | 99/443 C |
| 4,562,771 | 1/1986 | Williams | 99/427 |
| 5,148,737 | 9/1992 | Poulson | 99/450 |

Primary Examiner—Timothy F. Simone

[57] ABSTRACT

A cooking grill with automatically rotatable food supporting racks. The grill comprises a container including an essentially closed lower horizontal plate, generally vertical disposed plates and an open upper edge with peripheral walls. A pair of support racks are supported by the peripheral wall. Each of the racks is comprised of a lower apertured plate of open mesh upon which the food to be cooked may be placed. An upper apertured plate of open mesh is adapted to be positioned over the food. Hinges couple the upper and lower plates and a releasable clamp couples together the plates. A support couples the edges of each of the racks for rotatable movement of each of the racks independent of the movement of the other of the racks. Such coupling supports include rods extending outwardly and secured at their interior ends to the lower racks with their exterior ends supported in bearing assemblies. A tubular support surrounds each of the rods. Such tubular supports are secured to the upper edge of the peripheral wall of the container. Motors with drive shafts and gear assemblies couple the drive shafts of the motors with the rods.

3 Claims, 4 Drawing Sheets

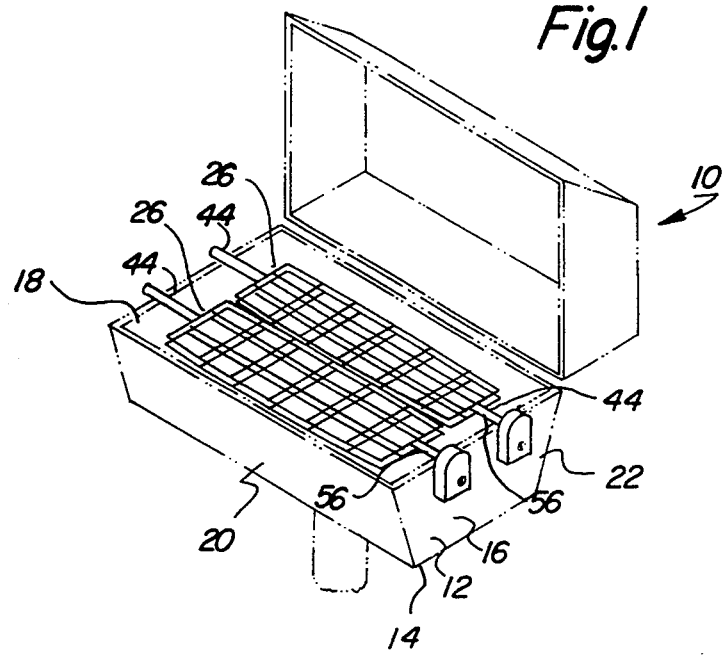
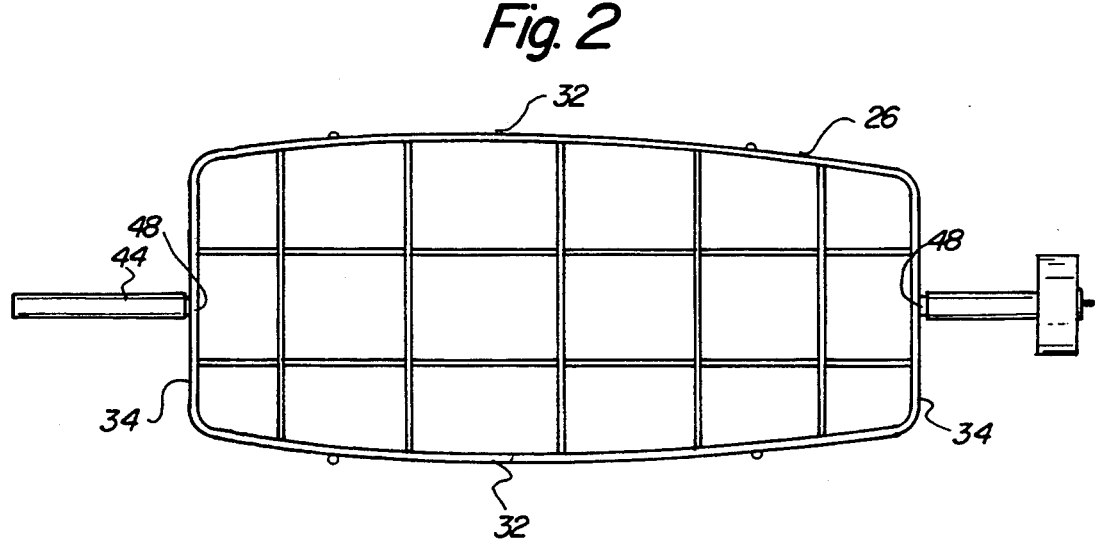

COOKING GRILLS WITH AUTOMATICALLY ROTATABLE FOOD SUPPORTING RACKS

BACKGROUND OF THE INVENTION

1. Field of the Invention

The present invention relates to cooking grills with automatically rotatable food supporting racks and more particularly pertains to supporting foods to be cooked on a grill and to rotating the supported foods for the cooking of the opposite sides thereof.

2. Description of the Prior Art

The use of grills with food turning racks is known in the prior art. More specifically, grills with food turning racks heretofore devised and utilized for the purpose of supporting and turning foods with respect to a grill during the cooking process are known to consist basically of familiar, expected, and obvious structural configurations, notwithstanding the myriad of designs encompassed by the crowded prior art which has been developed for the fulfillment of countless objectives and requirements.

The prior art discloses a large number of grills with food supporting racks. By way of example, U.S. Pat. No. 3,943,837 to Trkla discloses a dual purpose barbecue grill and rotisserie.

U.S. Pat. No. 4,181,074 to Hieb discloses a rotisserie and brazier.

U.S. Pat. No. 4,208,959 to Schmidt discloses a grill device.

U.S. Pat. No. 4,924,766 to Hitch discloses a rotisserie device.

U.S. Pat. No. 5,001,971 to Beller discloses a shishkabob rotisserie.

In this respect, cooking grills with automatically rotatable food supporting racks according to the present invention substantially depart from the conventional concepts and designs of the prior art, and in doing so provide an apparatus primarily developed for the purpose of supporting foods to be cooked on a grill and for rotating the supported foods for the cooking of the opposite sides thereof.

Therefore, it can be appreciated that there exists a continuing need for new and improved cooking grills with automatically rotatable food supporting racks which can be used for supporting foods to be cooked on a grill and for rotating the supported foods for the cooking of the opposite sides thereof. In this regard, the present invention substantially fulfills this need.

SUMMARY OF THE INVENTION

In view of the foregoing disadvantages inherent in the known types of grills with food supporting racks now present in the prior art, the present invention provides an improved cooking grill with automatically rotatable food supporting racks. As such, the general purpose of the present invention, which will be described subsequently in greater detail, is to provide new and improved cooking grills with automatically rotatable food supporting racks and methods which have all the advantages of the prior art and none of the disadvantages.

To attain this, the present invention essentially comprises a new and improved cooking grill with automatically rotatable food supporting racks comprising, in combination, a container adapted to provide heat to food supported thereabove, the container including an essentially closed lower horizontal plate, generally vertical disposed plates extending upwardly from the periphery of the lower plate and an open upper edge with peripheral walls; a pair of support racks adapted to be supported by the peripheral wall of the container in a generally horizontal orientation, each of the racks being comprised of a lower apertured plate of open mesh upon which the food to be cooked may be placed, an upper apertured plate of open mesh adapted to be positioned over the food to be cooked located on the lower apertured plate, the upper and lower plates each having long longitudinal edges and short lateral edges therebetween, hinge means coupling the upper and lower plates along adjacent longitudinal edges thereof, and a releasable clamp to couple together the upper and lower plates with the food to be cooked therebetween; support means coupling the lateral edges of each of the racks for rotatable movement of each of the racks independent of the movement of the other of the racks, the support means including rods extending outwardly and secured at their interior ends to the lower racks and having exterior ends supported in bearing assemblies and also including a tubular support surrounding each of the rods, the tubular supports being secured to the upper edge of the peripheral wall of the container to allow rotation of the racks within the tubes for rotating the racks and food supported therein; drive means including a motor with a drive shaft and a bevel gear assembly for coupling the drive shaft of the motor with one rod whereby activation of the motor will rotate the shaft to turn over the food to be cooked; and control means coupled to the drive means and including a power source in the form of batteries, an off/on switch and a timer and timer control coupled to the motor whereby the motor may be energized for a preselected time at preselected intervals for automatically turning the rack and the foods to be cooked.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved cooking grills with automatically rotatable food supporting racks which have all the advantages of the prior art grills with food supporting racks and none of the disadvantages.

It is another object of the present invention to provide new and improved cooking grills with automatically rotatable food supporting racks which may be easily and efficiently manufactured and marketed.

It is a further object of the present invention to provide new and improved cooking grills with automatically rotatable food supporting racks which are of a durable and reliable construction.

An even further object of the present invention is to provide new and improved cooking grills with automatically rotatable food supporting racks which are susceptible of a low cost of manufacture with regard to both materials and labor, and which accordingly are then susceptible of low prices of sale to the consuming public, thereby making such cooking grills with automatically rotatably food supporting racks economically available to the buying public.

Still yet another object of the present invention is to provide new and improved cooking grills with automatically rotatable food supporting racks which provide in the apparatuses and methods of the prior art some of the advantages thereof, while simultaneously overcoming some of the disadvantages normally associated therewith.

Even still another object of the present invention is to support foods to be cooked on a grill and to rotate the supported foods for the cooking of the opposite sides thereof.

Lastly, it is an object of the present invention to provide a cooking grill with automatically rotatable food supporting racks comprising a container including an essentially closed lower horizontal plate, generally vertical disposed plates extending upwardly from the periphery of the lower plate and an open upper edge with peripheral walls; a pair of support racks supported by the peripheral wall of the container in a generally horizontal orientation, each of the racks being comprised of a lower apertured plate of open mesh upon which the food to be cooked may be placed, an upper apertured plate of open mesh adapted to be positioned over the food to be cooked located on the lower apertured plate, the upper and lower plates each having long longitudinal edges and short lateral edges therebetween, hinge means coupling the upper and lower plates along adjacent longitudinal edges thereof, and a releasable clamp to couple together the upper and lower plates; support means coupling the lateral edges of each of the racks for rotatable movement of each of the racks independent of the movement of the other of the racks, the support means including rods extending outwardly and secured at their interior ends to the lower racks and having exterior ends supported in bearing assemblies and also including a tubular support surrounding each of the rods, the tubular supports being secured to the upper edge of the peripheral wall of the container; and drive means including a motor with a drive shaft and a gear assembly for coupling the drive shaft of the motor with one rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the new and improved cooking grill with automatically rotatable food supporting racks constructed in accordance with the principles of the present invention.

FIG. 2 is a plan view of one of the rotatable racks illustrated in FIG. 1.

The same reference numerals refer to the same parts throughout the various Figures.

DESCRIPTION OF THE PREFERRED EMBODIMENT

Figure 3:
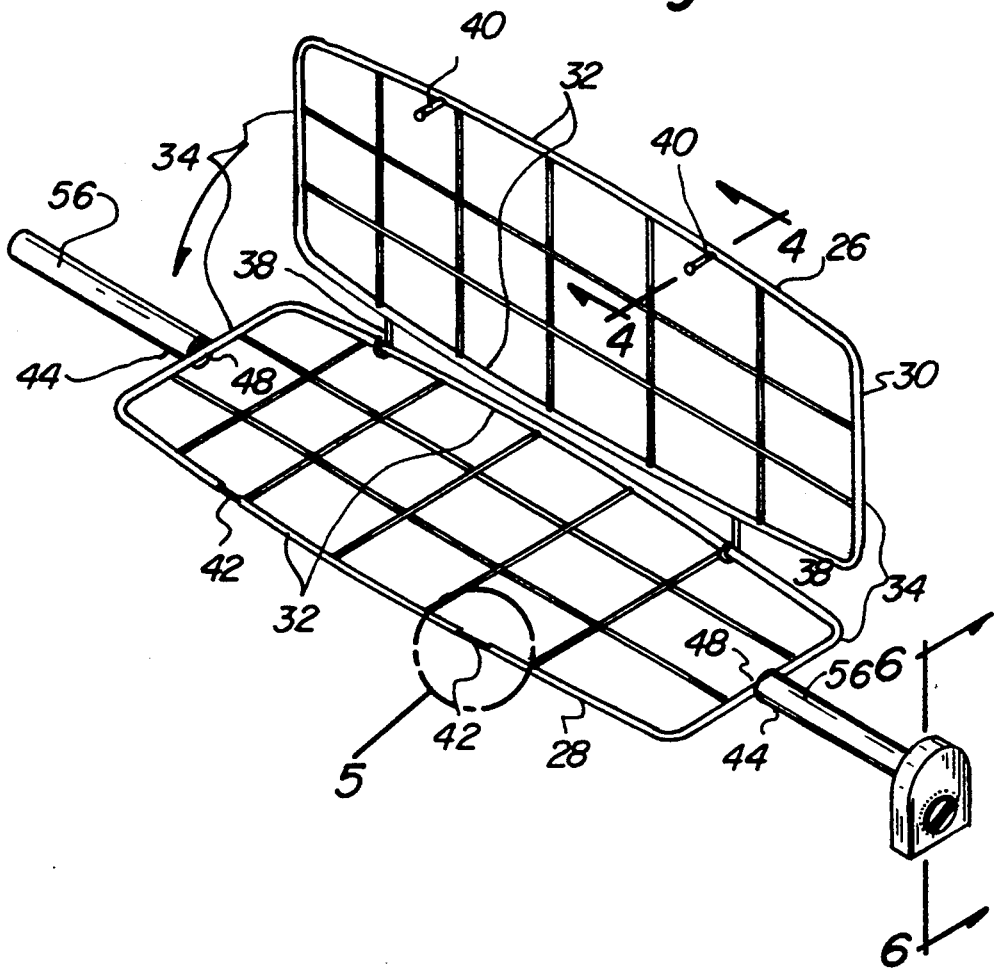
FIG. 3 is a perspective view of the rack of FIG. 2 with the upper half of the rack open for the receipt or removal of food.
Figure 4:
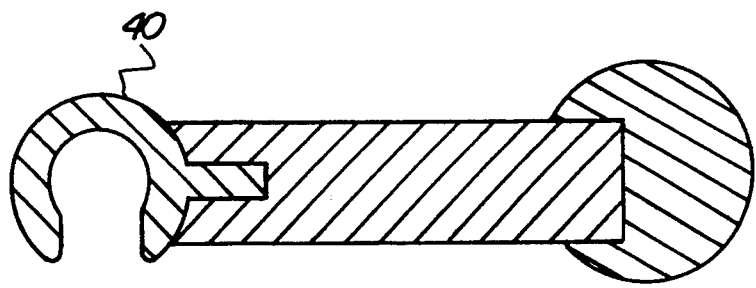
FIG. 4 is a cross-sectional view taken along line 4—4 of FIG. 3.
Figure 5:
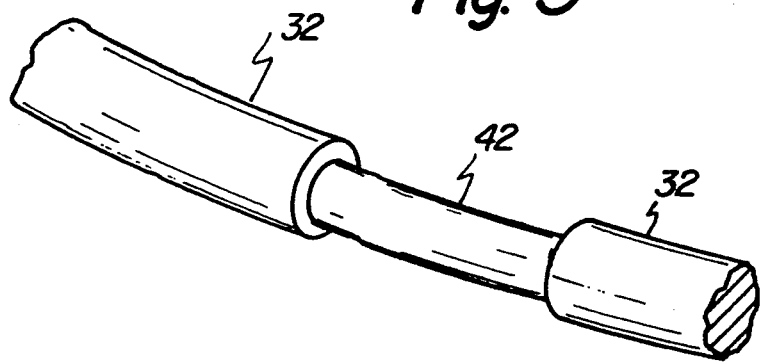
FIG. 5 is an enlarged perspective illustration of the portion of the rack to receive the clip shown in FIG. 4.
Figure 6:
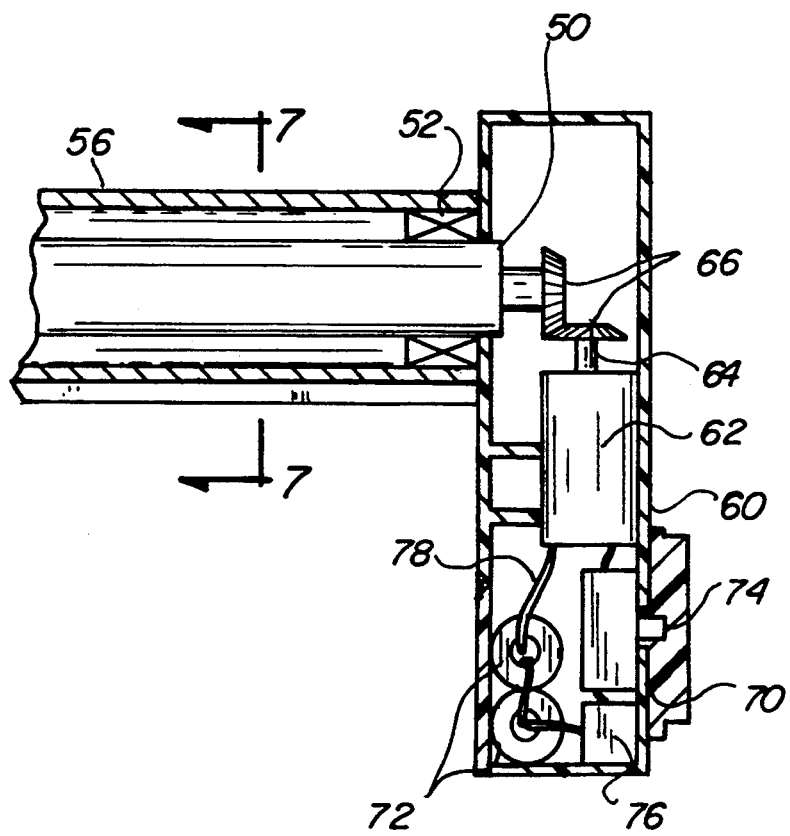
FIG. 6 is a cross-sectional view of a portion of the control mechanisms taken along line 6—6 of FIG. 3.
Figure 7:
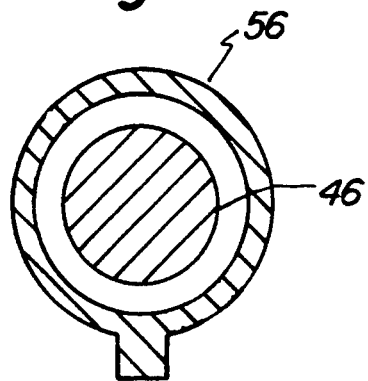
FIG. 7 is a cross-sectional view taken along line 7—7 of FIG. 6.
Figure 8:
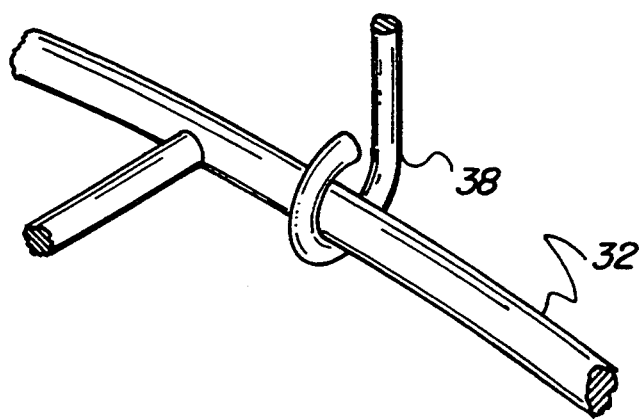
FIG. 8 is a perspective illustration of the coupling of the clip shown in FIG. 4 to the opposite support surface.

With reference now to the drawings, and in particular to FIGS. 1 through 8 thereof, the preferred embodiment of the new and improved cooking grills with automatically rotatable food supporting racks embodying the principles and concepts of the present invention and generally designated by the reference numeral 10 will be described.

The present invention, the new and improved cooking grill with automatically rotatable food supporting racks, is a system comprised of a plurality of component elements. In their broadest context, such component elements include a container, support racks, support means for the racks, drive means and control means. The individual components are specifically configured and correlated with respect to each other so as to attain the desired objective.

More specifically, the system 10 includes a support container 12. Such container is adapted to provide heat to food supported thereabove. The heat may be provided by electrical elements, charcoals, either natural or synthetic, gas or any known type of heat-generating mechanism. The container includes an essentially closed lower horizontal plate 14. It also includes generally vertically disposed plates 16 extending upwardly from the periphery of the lower plate. It also includes an open upper edge 18 with peripheral walls. The walls include long longitudinal walls 20 and short lateral walls 22 therebetween.

Next provided is a pair of support racks 26. Such support racks are adapted to be supported by the peripheral wall of the container in a generally horizontal orientation during cooking. Each of the racks is comprised of a lower apertured plate 28 of an open mesh upon which the food to be cooked may be placed. Of a corresponding size and configuration is an upper apertured plate 30 of an open mesh which is adapted to be positioned over the food to be cooked which is located on the lower apertured plate. The upper and lower apertured plates each have long longitudinal edges 32 and short lateral edges 34 therebetween.

Hinges 38 are provided to couple the upper and lower plates. The coupling is along adjacent longitudinal edges thereof. Releasable clamps 40 functions to couple together the upper and lower plates at their longitudinal edges remote from the hinge. When coupled together, the plates support therebetween the food to be cooked. Coupling is to a reduced region 42 of the opposed wire.

Coupling the lateral edges of each of the racks are support means 44. The support means are adapted to provide for rotatable movement of each of the racks independent of the movement of the other of the racks. Such support means include rods 46 extending outwardly and secured at their interior ends 48 to the lower racks. The rods have exterior ends 50. The exterior ends are supported in a rotatable manner in bearing assemblies 52.

Also included therewith is a tubular support 56. Each such support surrounds each of an associated rod. The tubular supports are secured to the upper edge of the peripheral wall of the container. This allows for rotation of the racks within the tubes to rotate the racks and food supported thereon for the proper cooking of such food.

Automatic drive means 60 are provided for rotating the racks and supported food. Such drive means include a motor 62 with a drive shaft 64. A bevel gear assembly 66 couples the drive shaft 46 of the motor with one rod. A motor, shaft, bevel gear assembly and rod are provided for each rack for driving the racks independent of each other. In this manner, activation of either motor will rotate its associated shaft to turn over the food to be cooked which is supported on the associated racks.

Lastly provided are control means 70. The control means are operatively coupled to the drive means. Such control means include a power source 72, an off/on switch 74 and a timer 76 coupled in an electrical circuit through wires 78 to the motor. In this manner, the motor may be energized for a preselected time at preselected intervals as determined by the timer and timer controller. This is for automatically turning the racks and the food to be cooked for the appropriate times on one side and the other.

The present invention turns the food over automatically after a preset amount of time has expired. It makes it unnecessary to watch the time during the cooking process, so other tasks can be performed, such as making the salads. This device has been designed for use on outdoor grills of the charcoal and gas variety. The food would continue to be turned after each period of time has elapsed until it is turned off. The present invention is not to be confused with a rotisserie which rotates constantly. The food remains stationary, suspended over the fire for periods of time from one to ten minutes, after which the food is turned over one hundred and eighty degrees so it can be cooked on the other side. The process is identical to that which is used to cook steaks on an ordinary grill.

The present invention is used in pairs for convenience and to permit two loads to be cooked at the same time. It consists of a long spindle which extends across the grill and rotates in bearings mounted in the edge of the grill housing. Each spindle supports two parallel racks, which are one and one-half inches apart for insertion of the food and snap together to close. The racks are typically eighteen inches long and seven inches wide. Tiny geared electrical motors rotate the spindle one hundred and eighty degrees to turn the food over slowly. They are operated by rechargeable storage batteries, or by alternating household current. A timer controls the operation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved cooking grill with automatically rotatable food supporting racks comprising, in combination:

a container adapted to provide heat to food supported thereabove, the container including an essentially closed lower horizontal plate, generally vertical disposed plates extending upwardly from the periphery of the lower plate and an open upper edge with peripheral walls;

a pair of support racks adapted to be supported by the peripheral wall of the container in a generally horizontal orientation, each of the racks being comprised of a lower apertured plate of open mesh upon which the food to be cooked may be placed, an upper apertured plate of open mesh adapted to be positioned over the food to be cooked located on the lower apertured plate, the upper and lower plates each having long longitudinal edges and short lateral edges therebetween, hinge means coupling the upper and lower plates along adjacent longitudinal edges thereof, and a releasable clamp to couple together the upper and lower plates with the food to be cooked therebetween;

support means coupling the lateral edges of each of the racks for rotatable movement of each of the racks independent of the movement of the other of the racks, the support means including rods extending outwardly and secured at their interior ends to the lower racks and having exterior ends supported in bearing assemblies and also including a tubular support surrounding each of the rods, the tubular supports being secured to the upper edge of the peripheral wall of the container to allow rotation of the racks within the tubes for rotating the racks and food supported therein;

drive means including a motor with a drive shaft and a bevel gear assembly for coupling the drive shaft of the motor with one rod whereby activation of the motor will rotate the shaft to turn over the food to be cooked; and control means coupled to the drive means and including a power source in the form of batteries, an off/on switch and a timer and timer control coupled to the motor whereby the motor may be energized for a preselected time at preselected intervals for automatically turning the rack and the foods to be cooked.

2. A cooking grill with automatically rotatable food supporting racks comprising:

a container including an essentially closed lower horizontal plate, generally vertical disposed plates extending upwardly from the periphery of the lower plate and an open upper edge with peripheral walls;

a pair of support racks supported by the peripheral wall of the container in a generally horizontal orientation, each of the racks being comprised of a lower apertured plate of open mesh upon which the food to be cooked may be placed, an upper apertured plate of open mesh adapted to be positioned over the food to be cooked located on the lower apertured plate, the upper and lower plates each having long longitudinal edges and short lateral edges therebetween, hinge means coupling the upper and lower plates along adjacent longitudinal edges thereof, and a releasable clamp to couple together the upper and lower plates;

support means coupling the lateral edges of each of the racks for rotatable movement of each of the racks independent of the movement of the other of the racks, the support means including rods extending outwardly and secured at their interior ends to the lower racks and having exterior ends supported in bearing assemblies and also including a tubular support surrounding each of the rods, the tubular supports being secured to the upper edge of the peripheral wall of the container; and a pair of independently operable drive means including a motor with a drive shaft and gear assembly for each rod for coupling the drive shaft of each motor with an associated rod and further including a timer associated with each drive means for periodically activating an associated drive means to rotate a preselected rod 180 degrees.

3. The apparatus as set forth in claim 2 and further including:

control means coupled to the drive means and including a power source in the form of batteries, an off/on switch and a timer and timer control coupled to the motor whereby the motor may be energized for a preselected time at preselected intervals for automatically turning the rack and the foods to be cooked.

* * * * *